Aug. 10, 1948. K. SATCHIK 2,446,669
FURNACE ASHPAN
Filed May 24, 1947
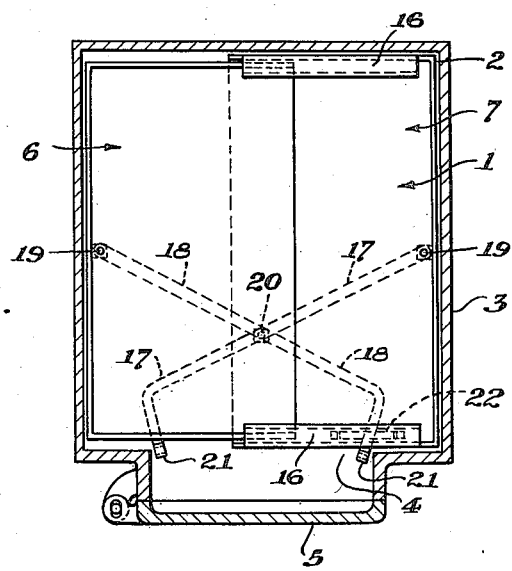
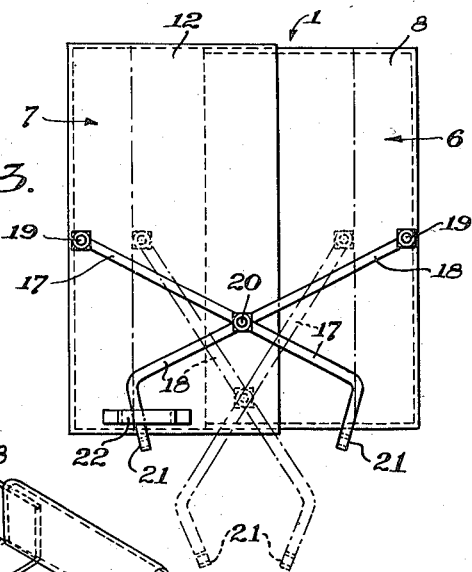
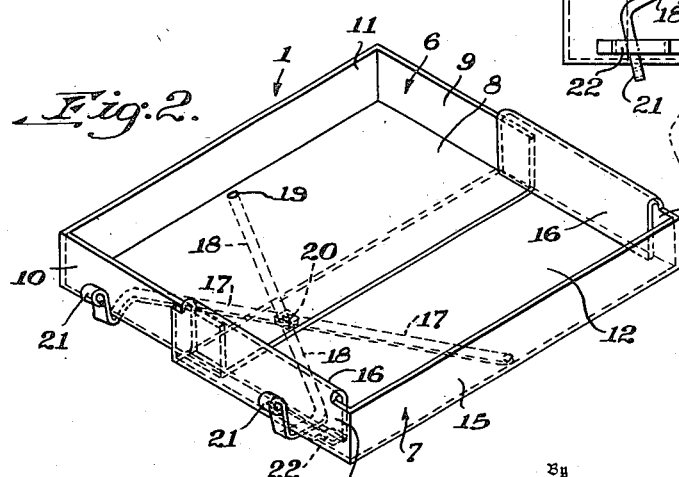
Inventor
KALMAN SATCHIK.
By Brown, Critchlow, Flick & Peckham
his Attorneys.

Patented Aug. 10, 1948

2,446,669

UNITED STATES PATENT OFFICE 2,446,669

FURNACE ASHPAN

Kalman Satchik, Pittsburgh, Pa.

Application May 24, 1947, Serial No. 750,332

4 Claims. (Cl. 126—243)

This invention relates to ash pans and particularly to pans which are insertable in furnace ash pits to facilitate the removal of ash therefrom.

A particularly objectionable feature of a number of ash-producing domestic furnaces is that the ash must be removed by shoveling it from the ash pits, and this is not only a tedious and tiring job but also may result in spreading a great deal of ash about the room. Although the shoveling can be avoided by the use of an ash pan, ordinary pans are not used since the openings into the ash pits of many furnaces are too small to permit a pan, which is of sufficient size to cover the space beneath the furnace grate, to be inserted through the opening.

It is therefore an object of this invention to provide an ash pan the width of which can be sufficiently reduced to permit its insertion into an ash pit and then expanded so as to cover substantially the full area of the pit.

Other objects are to provide such a pan which is compact, sturdy and inexpensively made, which operates smoothly and easily and which, when placed in the ash pit and expanded, fits wholly within the walls of the pit.

According to the invention the pan includes inner and outer tray members each of which has a bottom, end walls and one side wall, the side wall of each member forming the two sides of the pan. The tray members interlock with each other in a telescopic laterally slidable engagement and a pair of arms are provided each of which is secured at one end to a different tray member in such a manner that moving the free ends of the arms toward or away from one another causes the pan to contract or expand. Preferably, the arms are attached to the bottom surface of the tray members and extend diagonally across the pan toward its front. The diagonal arms are pivotally connected together at their point of intersection and their free ends project forwardly of the tray where they are formed into convenient handles for swinging the arms to expand or contract the pan.

The preferred embodiment of the invention is illustrated in the accompanying drawings, of which Fig. 1 is a plan view of the pan positioned in a furnace and spread beneath a grate; Fig. 2 is a perspective view of an expanded pan, and Fig. 3 is a bottom view of the expanded pan showing its contracted position in dotted lines.

Referring to the drawings and in particular to Fig. 1, the pan, generally indicated by the numeral 1, is shown positioned in an ash pit 2 of a furnace 3. Entrance into the ash pit is through an opening 4 customarily formed centrally on the lower part of the front wall of the furnace and provided with a hinged door 5. In most furnaces, this opening is not as wide as the ash pit so that an ordinary pan which would cover the full area of the pit can not be inserted therethrough.

One feature of this invention is that a pan is provided which can be inserted through opening 4 and then expanded to the full width of the pit. The pan includes a pair of inner and outer tray members 6 and 7, the inner member being formed of a bottom 8, end walls 9 and 10, and a side wall 11, and the outer member also having a bottom 12, end walls 13 and 14 and a side wall 15. Inner member 6 is received within the end walls of outer member 7 and the two members are telescoped together in a laterally slidable engagement so as to permit the pan to be expanded or contracted. To interlock the trays in their slidable relationship, the upper edges of the end walls 13 and 14 of the outer tray are bent inwardly and downwardly to form flanges 16 which loop over end walls 9 and 10 of the inner tray. Although such interlocking construction is preferred since it minimizes frictional engagement and also possible jamming of the members due to grit and ash, it will be obvious that other common interlocks, either of the end walls or the bottoms of the members, may be substituted.

Lever arms 17 and 18 are provided to facilitate the sliding together or apart of the tray members. As shown in the drawings, the arms are pivotally secured by rivets 19 or the like to the bottom surfaces of the tray members, extend diagonally and forwardly across the pan and are pivotally connected together at their point of intersection by any suitable means such as a rivet 20. Each arm is attached to the bottom of a different tray member at equal distances from the rear and sides of the pan and the arms also are of the same length and diagonal inclination so that the point of intersection of the arms lies at all times in the central longitudinal plane of the pair. Preferably, arm 17 is attached to outer tray member 7 and arm 18 to inner member 6 and at the intersection arm 18 passes over arm 17. The arms extend diagonally to a position near front end walls 10 and 14 of the tray members where they are bent inwardly of the pan, and these inwardly bent or straight portions project forwardly of the pan where they are inclined upwardly to form convenient handle portions 21.

In order to support the arms, a bracket 22 is suspended near the front of the pan from the bottom of outer tray member 7 and the straight portion of the lever arm 18 is slidably carried in the bracket. No bracket is required or used for arm 17 since it would interfere with the sliding of the members and also since sufficient support is provided for arm 17 through its pivotal connection to arm 18. Bracket 22 can be quite short since, as is apparent from the construction, arm 18 moves endwise only a short distance when the pan is expanded or contracted.

In use, the pan in the contracted position shown by the dotted line in Fig. 4, is inserted into the ash pit of a furnace through opening 4. When fully inserted, it is expanded to the sides of the pit by grasping handles 21 and swinging them away from each other. In order that the ash pit door may be closed after the pan has been inserted and expanded, it is desirable that handles 21 swing into a position closely adjacent to the front wall of the pan and this can be accomplished by adjusting the length of the arms, the points of their attachment to the pan and the degree of their diagonal inclination. When the pan has partly filled, it can be quickly removed and emptied by contracting and withdrawing it from the pit.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. An expandable and contractable ash pan for a furnace ash pit, comprising inner and outer tray members each having a bottom, end walls and one side wall, the upper edges of said end walls of the outer member being bent inwardly and downwardly and the end walls of said inner member being telescopically received within said bent portions, and a pair of pivotally connected lever arms each having one end attached to a different one of said tray members and the other end projecting forwardly of said pan, said pan being contractable for placing it in an ash pit by swinging said arms toward each other and being expandable when in the pit by swinging said arms away from each other.

2. An expandable and contractable ash pan for a furnace ash pit, comprising inner and outer tray members each having a bottom, end walls and one side wall, means formed on said members interlocking them together in laterally slidable engagement, a pair of lever arms each having one end pivotally connected at corresponding positions to the bottom surface of a different one of said tray members, said arms also having diagonally extending portions pivotally connected together at their point of intersection and straight portions projecting forwardly of the pan, said pan being contractable for placing it in an ash pit by swinging said arms toward each other and being expandable when in the pit by swinging said arms away from each other, and a bracket suspended from said outer tray member and slidably carrying the straight portion of the lever arm attached to said inner tray member.

3. An expandable and contractable ash pan for a furnace ashpit, comprising inner and outer tray members each having a bottom, end walls and one side wall, the upper edges of said end walls of the outer member being bent inwardly and downwardly and the end walls of said inner member being telescopically received within said bent portions, a pair of lever arms each having one end pivotally connected at corresponding positions to the bottom surface of a different one of said tray members, said arms also having diagonally extending portions pivotally connected together at their point of intersection and straight portions projecting forwardly of the pan, said pan being contractable for placing it in an ash pit by swinging said arms toward each other and being expandable when in the pit by swinging said arms away from each other, and a bracket suspended from said outer tray member and slidably carrying the straight portion of the lever arm attached to said inner tray member.

4. An expandable and contractable ash pan for a furnace ash pit, comprising inner and outer tray members each having a bottom, end walls and one side wall, the upper edges of said end walls of said outer member being bent inwardly and downwardly and the end walls of said inner member being telescopically received within said bent portions, a pair of upper and lower lever arms, said lower arm pivotally secured at one end to the bottom surface of said outer tray member and said upper arm having an end pivotally secured at a corresponding position to the bottom surface of said inner member, said arms extending diagonally across the bottom of said pan and being pivotally secured together at their point of intersection, the free ends of the arms projecting forwardly of the pan, said pan being contractable for placing it in an ash pit by swinging said arms toward each other and being expandable when in the pit by swinging said arms away from each other, and a laterally extending bracket suspended from the forward portion of said outer member and slidably carrying said upper lever arm, said arms being of such a length and so connected that said free ends lie in close proximity to the front of the pan when the pan is expanded.

KALMAN SATCHIK.

REFERENCES CITED

The following references are of record in the file of this patent:

UNITED STATES PATENTS

| Number | Name | Date |
| --- | --- | --- |
| 467,988 | Jenkins | Feb. 2, 1892 |
| 812,370 | Schotto | Feb. 13, 1906 |

FOREIGN PATENTS

| Number | Country | Date |
| --- | --- | --- |
| 239,574 | Germany | Oct. 16, 1911 |